Patented June 18, 1935

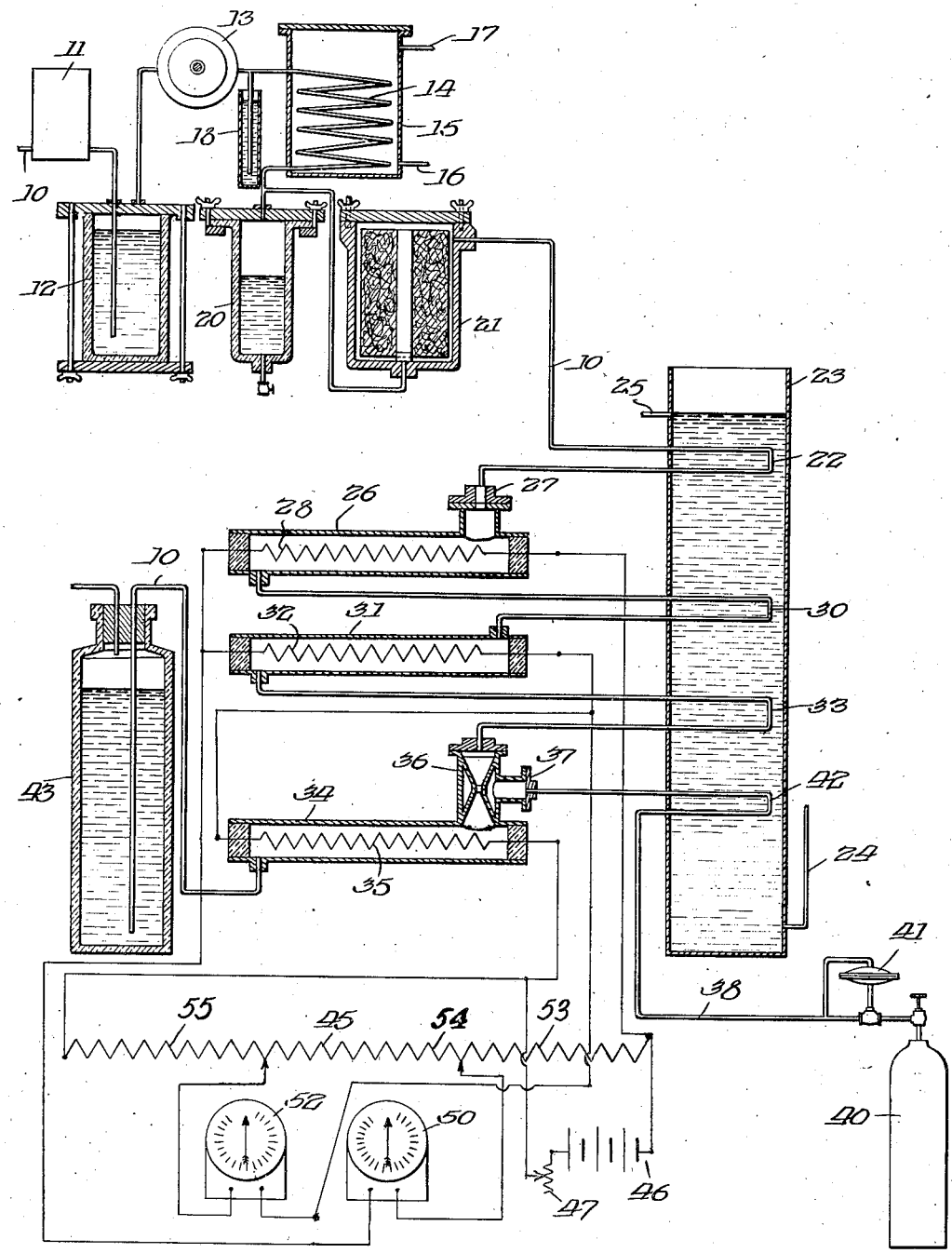
June 18, 1935.  A. H. D. HOWE  2,005,036
METHOD AND APPARATUS FOR GAS ANALYSIS
Filed Feb. 3, 1932

2,005,036

UNITED STATES PATENT OFFICE 2,005,036

METHOD AND APPARATUS FOR GAS ANALYSES

Alonzo H. Don Howe, Chicago, Ill.

Application February 3, 1932, Serial No. 590,725

4 Claims. (Cl. 23—232)

The invention relates to improvements in gas analyzing apparatus and particularly to an apparatus for determining the oxygen content in kilns and furnace gases.

Proper and economical operation of kilns can be greatly facilitated if the percentages of carbon monoxide and excess air in the gas are known. Since carbon dioxide is liberated in varying amounts in the calcining of the raw material as well as from the combustion of coal, the percentage of this constituent in the kiln gases is not an indication of the amount of excess air present. This can only be determined by knowing the percentage of oxygen with relation to the nitrogen.

Continuously operating gas analyzing apparatus has been constructed employing metal wires encased in separate tubes and connected into an electrical circuit so as to form respective arms of a Wheatstone bridge. By passing streams of gas over the heated wires the change in the electrical resistances of the wires, due to the increased temperature by the burning of a combustible constituent of the gas, can be determined. The present invention makes use of the above operation in combination with means for maintaining the gas streams passed through the tubes under constant pressure and temperature whereby a constant weight of gas will flow through a small orifice.

The present invention has for its object to provide a continuously operating gas analyzing apparatus which will record directly the percentages of carbon monoxide and oxygen in kiln or other gases having gaseous constituents.

With these and other objects in view, the invention may consist of certain novel features of construction and operation as will be more fully described and particularly pointed out in the specification, drawings and claims appended hereto.

The figure is a diagrammatic illustration of a gas analyzing apparatus constructed in accordance with the present invention.

The gas from the kiln is conducted by the tube 10 to a dust filter 11 and is then discharged into an alkaline solution contained in the glass jar 12. The solution is for the purpose of absorbing or removing any carbon dioxide contained in the gas. The gas pump 13 withdraws the gas from the jar 12 and forces the same through a cooling coil 14 positioned within a container 15 having a cold water inlet and outlet 16 and 17, respectively, for providing a cooling medium. Intermediate the cooling coil and the gas pump is positioned a pressure relieve valve 18, which forms a mercury seal and functions to maintain the gas in the system at constant pressure. A moisture trap consisting of a container 20 is provided for collecting the moisture precipitated in the cooling coil 14. The gas after leaving the cooling coil is conducted to any suitable gas drier 21 containing calcium chloride for removing any trace of moisture from the gas.

From the gas drying apparatus the pipe 10 conducts the gas to a coil 22 positioned in a cooling bath 23 having a water inlet and outlet 24 and 25, respectively, for maintaining a cooling medium whereby the gas may be maintained at a constant temperature in order that greater efficiency in the determination of the carbon monoxide and oxygen content may be secured. The gas from the cooling bath is then conducted to a combustion tube 26 provided with a graduated orifice 27 and having positioned therein a coil of platinum wire 28, and from this tube to another coil 30 located in the cooling bath and subsequently to a second combustion tube 31 having positioned therein a coil of platinum wire 32, and in other respects the same as the tube 26, with the exception that the graduated orifice is omitted. A third coil 33 is interposed between the second and a third combustion tube 34 having a similar coil of platinum wire 35 and a supplementary orifice or inlet 36 forming a Venturi throat with which is associated the graduated orifice 37 whereby hydrogen gas or other suitable combustible is admitted from the supply pipe 38. The hydrogen gas is supplied from container 40, the pressure being controlled by the valve 41 and the temperature being controlled by the coil 42 located in the cooling bath so that the hydrogen gas supplied is at a constant temperature and pressure. Also the orifice is selected of a size sufficient to admit a quantity of hydrogen for the complete combustion of the maximum amount of oxygen which the kiln gas may contain. From the combustion tube 34 the gas is conducted to the water chamber 43 which forms a water seal and thus maintains the gas within the system beyond the orifice 27 at a constant pressure.

Associated with the combustion tube is a compound Wheatstone bridge 45 of which the coils 28, 32 and 35 constitute respective arms. A battery 46 having adjustable resistances 47, by which the potential of the battery can be varied, is provided for maintaining the platinum wires within the combustion tubes at the ignition temperature of any combustible constituent in the kiln gases. From a study of the wiring diagram it will be seen that the coils 28, 32 and 35 are connected in series as is also the adjustable resistances 53, 54 and 55 of the Wheatstone bridge, each series circuit being connected in parallel with the battery 46. As the galvanometers 50 and 52 connect the respective series circuits at points between the coils and resistances it will be understood that their readings will show zero, no current flowing through them when the various resistances 53, 54 and 55 are adjusted to balance the coils 28, 32 and 35, respectively.

The apparatus is now ready for operation. The gas with all particles of dust and carbon dioxide removed, and at a constant temperature and pressure, is admitted to the graduated orifice 27 so that a constant weight of the gas flows through the combustion tube 26. Should the gas contain any carbon monoxide, combustion of the same with the oxygen in the gas readily takes place, due to the heated wires 28 and the catalytic action of the platinum. As a result the temperature of the wire 28 is increased, due to the heat of combustion, which causes a corresponding effect in the electrical resistance of the coil. The gas being admitted to the second combustion tube 31 is now devoid of any combustible constituent and therefore the temperature of the coil 32 remains constant with the electrical resistance of the coil also remaining constant. However, the change in the electrical resistance of the coil 28 unbalances the Wheatstone bridge and causes a deflection to be recorded in the milliammeter 50 calibrated to read or indicate directly the percentage of carbon monoxide in the gas. The gas as it is admitted to the combustion tube 34 is supplied with a predetermined amount of hydrogen at constant pressure and temperature, which results in the combustion of the remaining oxygen, causing a corresponding increase in temperature in the heated coil of platinum wire 35. The resulting change in the electrical resistance in the coil is recorded by the deflection in the milliammeter 52 calibrated to read directly in percentages of oxygen. It is therefore apparent that the compound Wheatstone bridge will function to measure the increase in temperature in the combustion tubes 26 and 34 with respect to the tube 31. It will be seen from the above that the reading recorded by the oxygen meter 52 does not give the correct percentage of oxygen in the gas since part of the same was removed by the combustion in the carbon monoxide in tube 26. Each cubic foot of carbon monoxide combines with one-half that amount of oxygen and thus each per cent of carbon monoxide recorded by the milliammeter 50 indicates one-half of one per cent of oxygen removed from the gas which can not be recorded by the oxygen meter 52. Therefore, in order to obtain the correct oxygen reading, it is necessary to add to the reading of meter 52 half of the carbon monoxide reading.

Where accuracy is required such as where the apparatus is used primarily as an analytical instrument rather than as a guide to combustion control certain additional corrections to the milli-ammeter readings may be made. The reading of either one of the milli-ammeters being a function in a slight degree of the reading of the other, a chart showing the value of these functions over the desired range may be constructed when the instrument is calibrated by actual tests. The function of the combustion tube 31 is primarily to minimize the necessity for such corrections in order to secure higher accuracy.

The present apparatus removes the carbon dioxide before quantitative analysis of the flue gases is made. This is desirable as in cement kilns and other calcining processes this portion is increased due to the evolution of carbon dioxide from the carbonates and therefore the percentages of carbon dioxide in the flue gases may no longer be used to determine the efficiency of combustion. With removal of the carbon dioxide a quantitative determination of the sample for carbon monoxide is then made within limits of the oxygen present on the basis of the heat of combustion evolved. The residual oxygen representing that portion above the theoretical requirements is then made to sustain combustion by the addition of a constant weight of a suitable combustible and a quantitative analysis is made with respect to the nitrogen on the basis of the heat of combustion evolved. A greater degree of accuracy is therefore secured in analyzing for carbon monoxide and oxygen with respect to the nitrogen content, since the percentage of excess air must in any case be computed from the nitrogen content. Further accuracy in the present apparatus is secured by passing a constant weight of the flue products through the device in a unit of time.

The invention furnishes apparatus of the utmost simplicity for continuous quantitative analysis of flue gases for oxygen in excess of the theoretical requirements as well as for carbon monoxide. In most combustion operations it is desirable to secure complete combustion with a minimum of excess air or in some instances with a predetermined fuel-air ratio. Complete combustion can in practice be secured only by the use of an excess of oxygen over the theoretical. It is therefore desirable that the operator be equipped with an instrument such as disclosed calibrated to read directly in percentages of excess air while at the same time indicating the loss due to incomplete combustion of carbon.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. The method of testing flue gases for their oxygen content which consists in removing carbon dioxide from the gases, maintaining the gases at constant pressure and temperature, passing the gases over heated catalytic agents to cause combustion of any combustible constituent thereof with any oxygen present, determining the temperature increase in the agents caused by the combustion, adding a gaseous combustible to the gaseous residue, passing the combined mixture over the other heated catalytic agents to cause combustion of the remaining oxygen, and determining the temperature increase in said last mentioned agents caused by the latter combustion.

2. A method for continuous analysis of flue gases for their oxygen content which consists in removing the carbon dioxide from the gases passing a constant weight of the gas per unit of time over heated catalytic agents to cause combustion of any combustible constituent thereof with any oxygen present, determining the temperature increase in the agents caused by the combustion, adding a constant weight per unit of time of a gaseous combustible to the gaseous residue, passing the combined mixture over the other heated catalytic agents to cause combustion of the remaining oxygen, and determining the temperature increase in said last mentioned agents caused by the latter combustion.

3. A continuously operating gas analyzing apparatus, in combination, a plurality of combustion tubes, a graduated orifice for admitting the gas at a constant pressure to the first of said tubes and connections for passing the gas through the remaining of the tubes, a second graduated orifice associated with the last of said tubes for admitting a combustible at a constant pressure thereto, catalytic wires located in the tubes and having connection to a Wheatstone bridge, means for heating said wires, means for maintaining the gas and combustible at a substantially constant temperature prior to the admission of the gas to the tubes, and means forming part of said bridge for measuring the change in resistance in said wires caused by the combustion in the tubes.

4. A continuously operating gas analyzing apparatus, in combination, a plurality of combustion tubes, means for removing the carbon dioxide from the gas, a graduated orifice for admitting the gas from the carbon dioxide remover and at a constant pressure to the first of said tubes, connections for passing the gas through the remaining of said tubes, a second graduated orifice associated with the last of said tubes for admitting a combustible at a constant pressure thereto, catalytic wires located in the tubes and having connection to a Wheatstone bridge, means for heating said wires, means for maintaining the gas and combustible at a substantially constant temperature prior to the admission of the gas to the tubes, and means forming part of said bridge for measuring the change in resistance in said wires caused by the combustion in the tubes.

ALONZO H. DON HOWE.